(12) United States Patent
Lee et al.

(10) Patent No.: US 8,947,849 B2
(45) Date of Patent: Feb. 3, 2015

(54) MULTILAYER CERAMIC ELECTRONIC COMPONENT AND MANUFACTURING METHOD THEREOF

(75) Inventors: Jin Woo Lee, Gyunggi-do (KR); Tae Hyeong Kim, Gyunggi-do (KR); Eung Soo Kim, Gyunggi-do (KR); Chi Hyoun Ro, Gyunggi-do (KR); Hang Kyu Cho, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 132 days.

(21) Appl. No.: 13/538,533

(22) Filed: Jun. 29, 2012

(65) Prior Publication Data
US 2013/0279074 A1   Oct. 24, 2013

(30) Foreign Application Priority Data

Apr. 18, 2012  (KR) .......................... 10-2012-0040389

(51) Int. Cl.
*H01G 4/00*       (2006.01)
(52) U.S. Cl.
USPC .................... 361/301.4; 361/303; 361/321.2
(58) Field of Classification Search
None
See application file for complete search history.

(56) References Cited

U.S. PATENT DOCUMENTS

| | | | | |
|---|---|---|---|---|
| 5,155,655 | A * | 10/1992 | Howard et al. | 361/303 |
| 5,687,055 | A * | 11/1997 | Miki | 361/305 |
| 2011/0149471 | A1 * | 6/2011 | Hur et al. | 361/321.2 |
| 2011/0234045 | A1 * | 9/2011 | Motoki et al. | 310/311 |

FOREIGN PATENT DOCUMENTS

| | | |
|---|---|---|
| JP | 2000-183491 | 6/2000 |
| JP | 2003-178926 | 6/2003 |

* cited by examiner

*Primary Examiner* — Dion R Ferguson
(74) *Attorney, Agent, or Firm* — McDermott Will & Emery LLP

(57) ABSTRACT

There is provided a multilayer ceramic electronic component. The multilayer ceramic electronic component includes a ceramic main body including a dielectric layer, and first and second internal electrodes disposed to face each other within the ceramic main body and having the dielectric layer interposed therebetween. When an average roughness of center lines of the first and second internal electrodes is Ra, a maximum distance from a virtual line corresponding to Ra to a bottom of a pit (d) formed below the virtual line is 0.1 μm to 13 μm. The surface roughness of the internal electrode printed surface is improved to decrease the occurrence of electrical shorts.

6 Claims, 3 Drawing Sheets

B - B'

MULTILAYER CERAMIC ELECTRONIC COMPONENT AND MANUFACTURING METHOD THEREOF

CROSS-REFERENCE TO RELATED APPLICATIONS

This application claims the priority of Korean Patent Application No. 10-2012-0040389 filed on Apr. 18, 2012, in the Korean Intellectual Property Office, the disclosure of which is incorporated herein by reference.

BACKGROUND OF THE INVENTION

1. Field of the Invention

The present invention relates to a multilayer ceramic electronic component having excellent reliability, and a manufacturing method thereof.

2. Description of the Related Art

Generally, electronic components formed of a ceramic material, such as a capacitor, an inductor, a piezoelectric element, a varistor, a thermistor, or the like, include a ceramic sintered body formed of a ceramic material, internal electrodes formed within the ceramic sintered body, and external electrodes installed on outer surfaces of the ceramic sintered body so as to be connected to the internal electrodes.

Among ceramic electronic components, a multilayer ceramic capacitor (MLCC) includes a plurality of multilayer dielectric layers, internal electrodes disposed to face each other, having a dielectric layer interposed therebetween, and external electrodes electrically connected to the internal electrodes.

MLCCs have been widely used as components for mobile communications devices such as computers, personal digital assistants (PDAs), cellular phones, and the like, due to advantages such as a small size, high capacitance, ease of mounting, and the like.

In accordance with the recent trend for high performance combined with slimness and lightness in electronic devices, affordable small sized, high performance electronic components have been in demand.

Therefore, attempts to thin and laminate dielectric layers and the internal electrodes in large numbers have been conducted through various methods. Recently, as a thickness of dielectric layers has been reduced, multilayer ceramic electronic components having increased numbers of layers have been manufactured.

In addition, the possibility that an electrical short will occur has increased due to a difference in surface roughness levels on an internal electrode printed surface, in accordance with thinness of the internal electrode, which may deteriorate reliability in manufacturing the multilayer ceramic electronic component.

In order to overcome this problem, an attempt to improve surface roughness characteristics of internal electrodes has been undertaken.

Although an attempt to improve surface roughness characteristics of internal electrodes has been described in the related art document, an effect of improving reliability by decreasing occurrence of electrical shorts may not be achieved.

RELATED ART DOCUMENT (Patent Document 1) Japanese Patent Laid-Open Publication No. 2003-178926

SUMMARY OF THE INVENTION

An aspect of the present invention provides a multilayer ceramic electronic component having excellent reliability, and a manufacturing method thereof.

According to an aspect of the present invention, there is provided a multilayer ceramic electronic component including: a ceramic main body including a dielectric layer; and first and second internal electrodes disposed to face each other within the ceramic main body and having the dielectric layer interposed therebetween, wherein, when an average roughness of center lines of the first and second internal electrodes is Ra, a maximum distance from a virtual line corresponding to Ra to a bottom of a pit (d) formed below the virtual line is 0.1 μm to 13 μm.

The dielectric layer may have an average thickness (td) of 2.0 μm or less.

The first and second internal electrodes may have an average thickness (te) of 2.0 μm or less.

The first and second internal electrodes may be stacked in an amount of 50 layers or more.

The multilayer ceramic electronic component may have a length of 1.0±0.09 mm or less and a width of 0.5±0.09 mm or less.

The first and second internal electrodes may include at least one metal selected from the group consisting of palladium (Pd), a palladium-silver (Pd—Ag) alloy, nickel (Ni), and copper (Cu).

According to another aspect of the present invention, there is provided a method of manufacturing a multilayer ceramic electronic component, the method including: preparing a ceramic green sheet using a slurry including a ceramic powder; forming an internal electrode pattern on the ceramic green sheet using a conductive paste including a metal powder; and stacking and sintering the ceramic green sheet to form a ceramic main body including a dielectric layer and first and second internal electrodes disposed to face each other and having the dielectric layer interposed therebetween, wherein, when an average roughness of center lines of the first and second internal electrodes is Ra, a maximum distance from a virtual line corresponding to Ra to a bottom of a pit (d) formed below the virtual line is 0.1 μm to 13 μm.

The stacking of the ceramic green sheet may be performed by coating a surface of a lamination fixture contacting the internal electrode pattern of the ceramic green sheet.

The first and second internal electrodes may be stacked in an amount of 50 layers or more.

The multilayer ceramic electronic component may have a length of 1.0±0.09 mm or less and a width of 0 5±0.09 mm or less.

The first and second internal electrodes may include at least one metal selected from the group consisting of palladium (Pd), a palladium-silver (Pd—Ag) alloy, nickel (Ni), and copper (Cu).

The method may further include forming a first external electrode electrically connected to the first internal electrode and a second external electrode electrically connected to the second internal electrode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
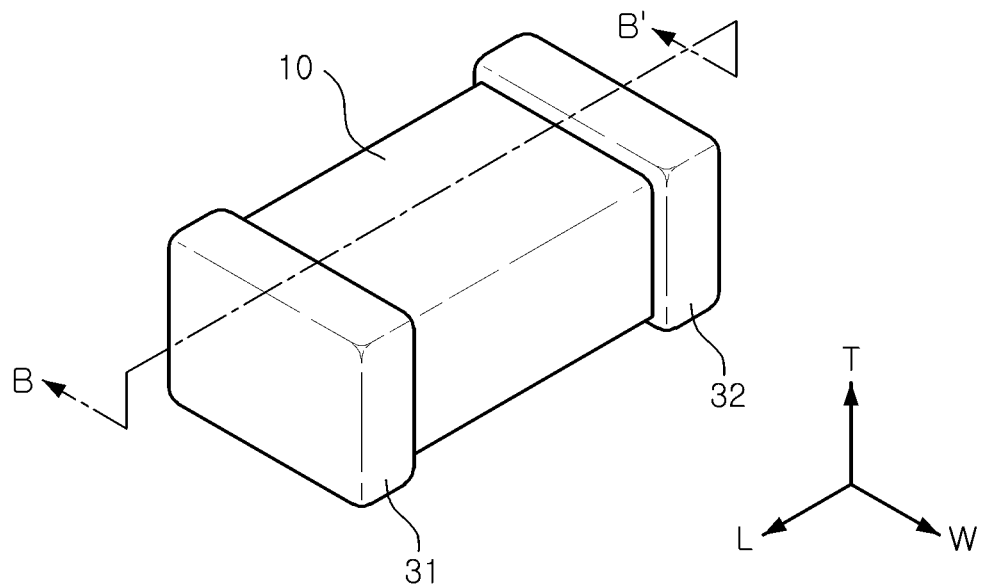
FIG. 1 is a perspective view schematically showing a multilayer ceramic capacitor according to an embodiment of the present invention.

Embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions of elements may be exaggerated for clarity, and the same reference numerals will be used throughout to designate the same or like elements.

Hereinafter, embodiments of the present invention will be described in detail with reference to the accompanying drawings.

FIG. 1 is a perspective view schematically showing a multilayer ceramic capacitor according to an embodiment of the present invention.

Figure 2:
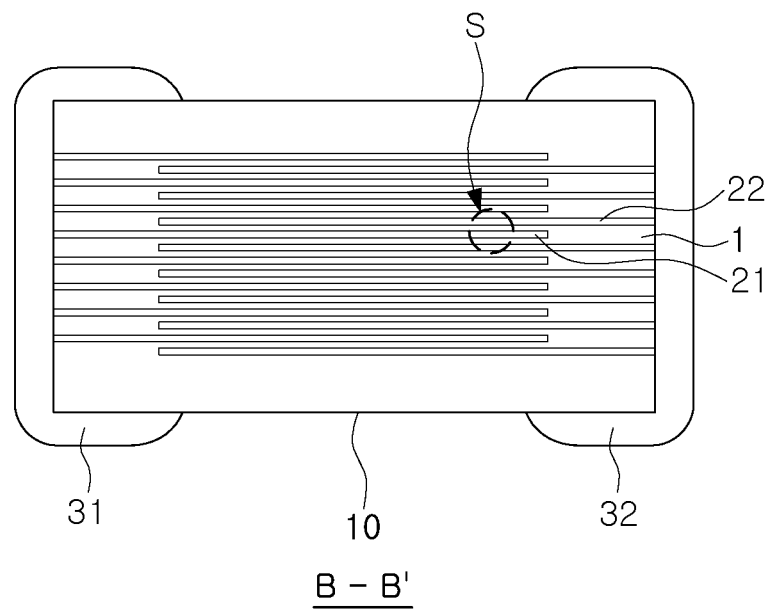
FIG. 2 is a cross-sectional view taken along line B-B' of FIG. 1.

FIG. 2 is a cross-sectional view taken along line B-B' of FIG. 1.

Figure 3:
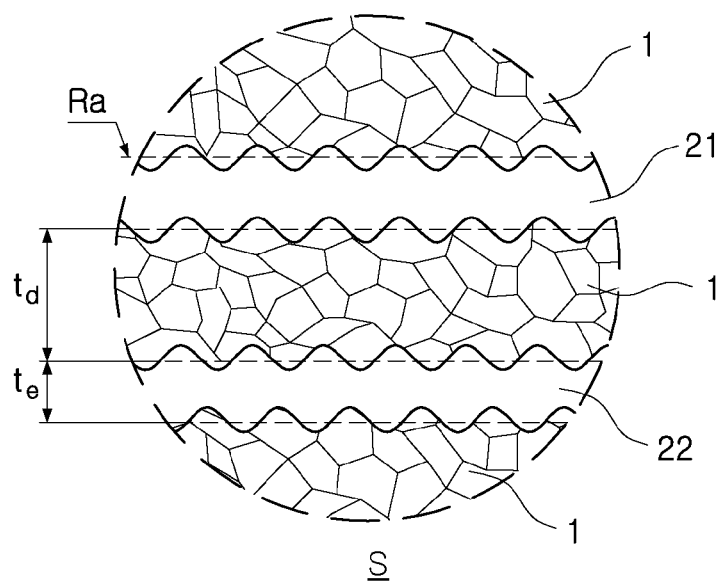
FIG. 3 is an enlarged view of a portion S showing thicknesses of an internal electrode and a dielectric layer in FIG. 2.

FIG. 3 is an enlarged view of portion S showing thicknesses of an internal electrode and a dielectric layer in FIG. 2.

Figure 4:
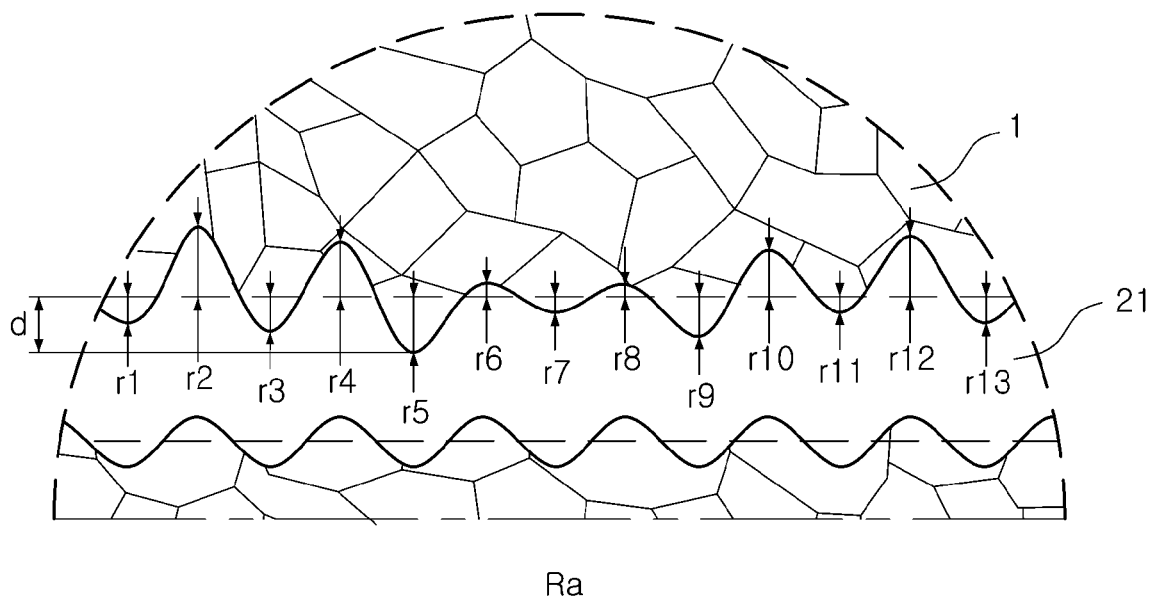
FIG. 4 is a view schematically showing an average roughness Ra of the center line of the internal electrode in FIG. 3.

FIG. 4 is a view schematically showing an average roughness Ra of a center line of the internal electrode in FIG. 3.

Referring to FIGS. 1 through 4, a multilayer ceramic electronic component according to the embodiment of the present invention may include a ceramic main body 10 including a dielectric layer 1; and first and second internal electrodes 21 and 22 disposed to face each other within the ceramic main body 10 and having the dielectric layer 1 interposed therebetween. When it is assumed that an average roughness of the center lines of the first and second internal electrodes 21 and 22 is Ra, a maximum distance from a virtual line corresponding to Ra to a bottom of a pit (d) formed below the virtual line may be 0.1 μm to 13 μm.

Hereinafter, the multilayer ceramic electronic component according to the embodiment of the present invention, particularly, a multilayer ceramic capacitor will be described. However, the present invention is not limited thereto.

The ceramic main body 10 is not particularly limited, but may have, for example, a hexahedral shape.

In the multilayer ceramic capacitor according to the embodiment of the present invention, as shown in FIG. 1, a 'length direction' refers to an 'L' direction, a 'width direction' refers to a 'W' direction, and a 'thickness direction' refers to a 'T' direction. Here, the 'thickness direction' is the same as a direction in which dielectric layers are laminated, that is, a 'lamination direction'.

According to the embodiment of the present invention, a raw material forming the dielectric layer 1 is not particularly limited as long as sufficient capacitance may be obtained therewith. For example, a barium titanate ($BaTiO_3$) powder may be used.

A material forming the dielectric layer 1 may be prepared by adding a ceramic additive, an organic solvent, a plasticizer, a binder, a dispersing agent, and the like, to powder such as a barium titanate ($BaTiO_3$) powder, or the like, according to an object of the present invention.

An average particle size of the ceramic powder used to form the dielectric layer 1 is not particularly limited, but may be controlled in order to achieve the object of the present invention. For example, the average particle size may be controlled to be 400 nm or less.

A material forming the first and second internal electrodes 21 and 22 is not particularly limited, but may be a conductive paste formed of at least one selected from a group consisting of, for example, a noble metal such as palladium (Pd), a palladium-silver (Pd—Ag) alloy, or the like, nickel (Ni), and copper (Cu).

In order to form capacitance, first and second external electrodes 31 and 32 may be formed on outer surfaces of the ceramic main body 10 and electrically connected to the plurality of internal electrodes 21 and 22.

The first and second external electrodes 31 and 32 may be formed of the same conductive materials as those of the internal electrodes, but are not limited thereto. For example, the first and second external electrodes 31 and 32 may be formed of copper (Cu), silver (Ag), nickel (Ni), or the like.

The first and second external electrodes 31 and 32 may be formed by applying and firing a conductive paste prepared by adding glass frit to metal powder.

In the multilayer ceramic capacitor according to the embodiment of the present invention, when it is assumed that an average roughness of the center lines of the first and second internal electrodes 21 and 22 is Ra, the maximum distance from the virtual line corresponding to Ra to the bottom of the pit (d) formed below the virtual line may be 0.1 μm to 13 μm.

The average roughness Ra of the center line of the internal electrode, a calculated value of the roughness of the surface of the internal electrode, refers to the roughness of the internal electrode obtained by calculating an average value based on the virtual center line of the roughness.

Specifically, referring to FIG. 4, in order to calculate the average roughness Ra of the center line of the internal electrode, the virtual centerline is drawn with respect to the roughness of one surface of the internal electrode.

Next, a plurality of distances (for example, $r_1, r_2, r_3 \ldots r_{13}$) are measured, based on the virtual center line of the roughness, the average value of the plurality of distances is calculated as represented by the following Equation, and the average roughness Ra of the center line of the internal electrode is then calculated using the calculated average value.

$$Ra = \frac{r_1 + r_2 + r_3 + \ldots r_n}{n}$$

Here, the roughness of the internal electrode may have a vertical concave-convex shape based on the average roughness Ra of the center line of the internal electrode.

A roughness portion formed downwardly of the virtual line of the average roughness Ra of the center line of the internal electrode may be defined as a pit.

That is, referring to FIG. 4, $r_1, r_3, r_5, r_7, r_9, r_{11}$, and $r_{13}$ correspond to the concave-convex shape formed downwardly of the virtual line of the average roughness Ra of the center line of the internal electrode, and they may be thus defined as pits.

According to the embodiment of the present invention, the maximum distance from the virtual line Ra to the bottom of the pit (d) formed below the virtual line may be controlled to be 0.1 μm to 13 μm, whereby an electrical short due to a difference in the surface roughness of the internal electrode printed surface in accordance with thinness of the internal electrode may be prevented.

More specifically, the maximum distance from the virtual line Ra to the bottom of the pit (d) formed below the virtual line is controlled to decrease occurrence of electrical shorts due to variations in the surface roughness of the internal electrode printed surface in accordance with the thinness of the internal electrode, whereby a large capacitance multilayer ceramic electronic component having excellent reliability may be implemented.

In the case in which the maximum distance from the virtual line Ra to the bottom of the pit (d) formed below the virtual line is less than 0.1 μm, the possibility that electrical shorts will occur may be decreased; however, adhesive strength between the internal electrode and the dielectric layer is lowered, such that a delamination defect may occur.

In addition, in the case in which the maximum distance from the virtual line Ra to the bottom of the pit (d) formed below the virtual line exceeds 13 μm, the possibility that electrical shorts will occur may be increased.

In order to control the maximum distance from the virtual line Ra to the bottom of the pit (d) formed below the virtual line, when ceramic green sheets having internal electrode patterns printed thereon are stacked during the manufacturing of the multilayer ceramic capacitor, lamination fixtures contacting the internal electrode patterns may be surface-coated.

The lamination fixture is not particularly limited as long as it is generally used to laminate the ceramic green sheets, but may be, for example, a porous sheet. A detailed description thereof will be provided below.

Referring to FIGS. 2 and 3, in the multilayer ceramic capacitor according to the embodiment of the present invention, an average thickness (te) of the first and second internal electrodes 21 and 22 may be 2.0 μm or less.

In the embodiment of the present invention, the average thickness of the first and second internal electrode 21 and 22 may be measured by scanning an image of a cross section of the ceramic main body 10 in a length direction using a scanning electron microscope (SEM), as shown in FIG. 2.

For example, as shown in FIG. 2, with respect to an image of any internal electrode obtained by scanning a length-thickness direction (L-T) cross section of the ceramic main body 10 taken in a central portion thereof in a width (W) direction with an SEM, an average value may be obtained by measuring the thickness of the internal electrode at thirty equidistant points thereof in the length direction.

The thicknesses at the thirty equidistant points may be measured in a capacitance forming portion in which the first and second internal electrodes 21 and 22 overlap.

In addition, in the case in which the average value measurement is performed on ten or more internal electrodes, the average thickness of the internal electrodes may be further generalized.

In addition, the average thickness (td) of the dielectric layer 1 may be 2.0 μm or less.

In the embodiment of the present invention, the average thickness of the dielectric layer 1 refers to the average thickness of the dielectric layer 1 disposed between internal electrodes 21 and 22.

The average thickness of the dielectric layer 1 may be measured by scanning the image of the cross section of the ceramic main body 10 in the length direction using an SEM, as shown in FIG. 2.

For example, as shown in FIG. 2, with respect to an image of any dielectric layer obtained by scanning the length-thickness direction (L-T) cross section of the ceramic main body 10 taken in the central portion thereof in the width (W) direction with an SEM, an average value may be obtained by measuring the thickness of the dielectric layer at thirty equidistant points in the length direction.

The thicknesses at the thirty equidistant points may be measured in the capacity forming portion in which the first and second internal electrodes 21 and 22 overlap.

The multilayer ceramic capacitor according to the embodiment of the present invention may be applied to subminiature and high capacity devices; however, the invention is not particularly limited. For example, the number of laminated first and second internal electrodes may be fifty or more.

In addition, the length and the width of the multilayer ceramic capacitor may be 1.0±0.09 mm or less and 0.5±0.09 mm or less, respectively.

Figure 5:
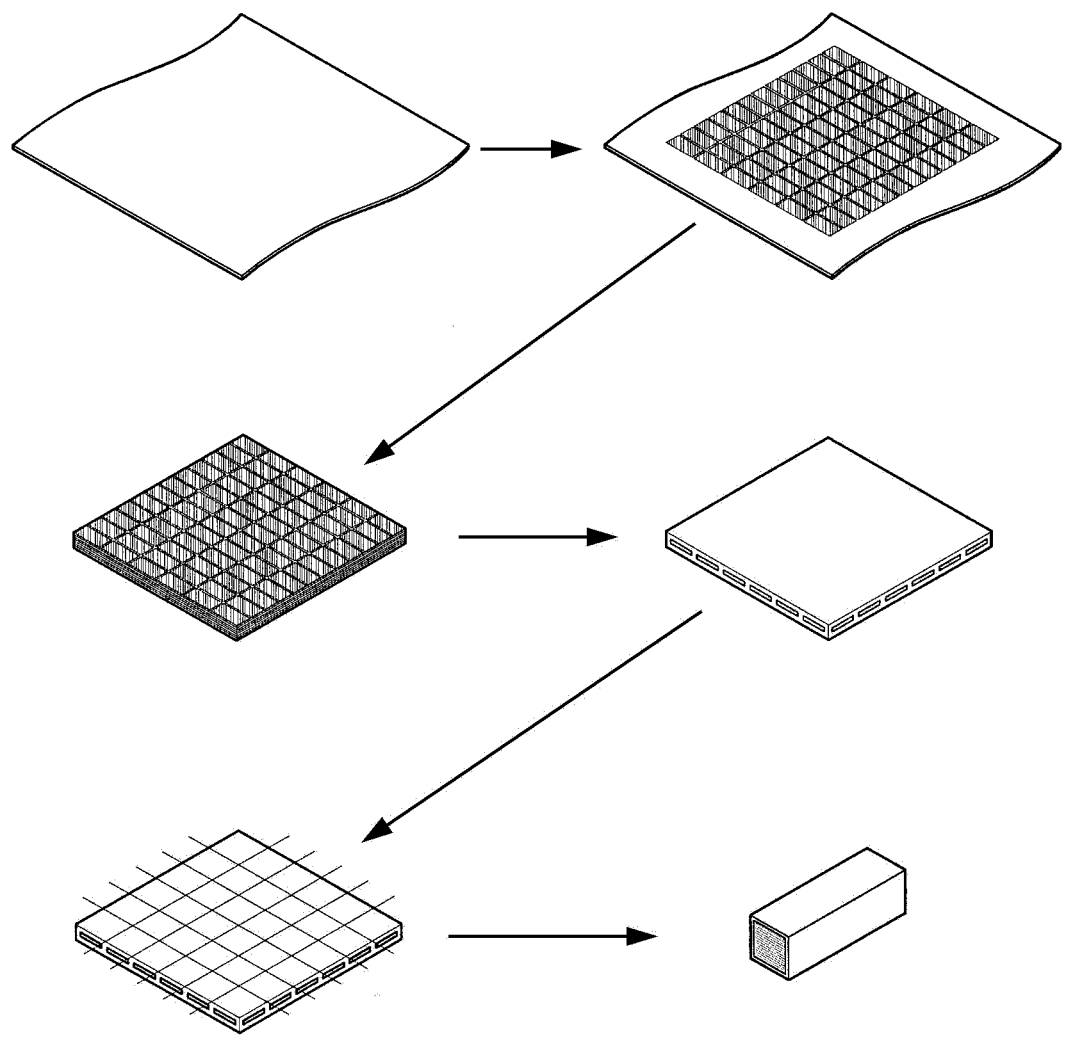
FIG. 5 is a view showing a manufacturing process of a multilayer ceramic capacitor according to another embodiment of the present invention.

FIG. 5 is a view showing a process of manufacturing a multilayer ceramic capacitor according to another embodiment of the present invention.

Referring to FIG. 5, a method of manufacturing a multilayer ceramic electronic component according to another embodiment of the present invention may include preparing a ceramic green sheet using a slurry including a ceramic powder; forming an internal electrode pattern on the ceramic green sheet using a conductive paste including a metal powder; and stacking and sintering the ceramic green sheet to form a ceramic main body including a dielectric layer, and first and second internal electrodes disposed to face each other and having the dielectric layer interposed therebetween. When it is assumed that an average roughness of center lines of the first and second internal electrodes is Ra, a maximum distance from a virtual line corresponding to Ra to a bottom of a pit (d) formed below the virtual line may be 0.1 μm to 13 μm.

In the method of manufacturing a multilayer ceramic electronic component according to another embodiment of the present invention, the ceramic green sheets including the dielectric layers may first be prepared.

Each ceramic green sheet may be prepared by producing a slurry through mixture of a ceramic powder, a binder, and a solvent and forming the slurry in a sheet shape having a thickness of several μm by a doctor blade method.

Next, the internal electrode pattern may be formed on the ceramic green sheet using the conductive paste including the metal powder.

Then, the ceramic green sheets may be stacked and sintered to form the ceramic main body including the dielectric layer and the first and second internal electrodes disposed to face each other and having the dielectric layer interposed therebetween.

When it is assumed that the average roughness of the center lines of the first and second internal electrodes is Ra, the maximum distance from the virtual line corresponding to Ra to the bottom of the pit (d) formed below the virtual line may be 0.1 μm to 13 μm.

The stacking of the ceramic green sheets may be performed by surface-coating lamination fixtures contacting the internal electrode patterns formed on the ceramic green sheets to control the maximum distance from the virtual line corresponding to Ra to the bottom of the pit (d) formed below the virtual line to be in the range of 0.1 μm to 13 μm.

More specifically, the ceramic green sheets may be sequentially stacked by adsorbing each of the ceramic green sheets onto the lamination fixture and then removing a release film disposed at a lower portion of the ceramic green sheet.

In this process, since a pinhole, or the like, may be present in the surface of the generally used lamination fixture, a difference in surface roughness levels may be generated in the internal electrode pattern printed on the ceramic green sheet.

The difference in surface roughness levels in the internal electrode pattern may cause electrical shorts between the internal electrodes of the multilayer ceramic capacitor to later be manufactured.

According to the embodiment of the present invention, in order to control the maximum distance from the virtual line corresponding to Ra to the bottom of the pit (d) formed below the virtual line to be in the range of 0.1 μm to 13 μm, the surface of the lamination fixture may be coated with an organic or inorganic material to thereby decrease the difference in surface roughness levels on the internal electrode pattern.

The lamination fixture is not particularly limited as long as it is generally used to laminate the ceramic green sheets. For example, a porous sheet may be used therefor.

A description of the same characteristics as those of the multilayer ceramic electronic component according to the above-described embodiment of the present invention will be omitted.

Hereafter, although an exemplary embodiment of the present invention will be described in more detail, the present invention is not limited thereto.

According to the inventive example, a test was performed in order to verify whether or not reliability according to a maximum distance from a virtual line corresponding to Ra to a bottom of a pit (d) formed below the virtual line is improved when it is assumed that an average roughness of the center lines of first and second internal electrodes is Ra.

A multilayer ceramic capacitor according to the inventive example was manufactured as follows:

First, a slurry, including a powder such as a barium titanate ($BaTiO_3$) powder, or the like, having an average particle size of 0.5 μm or less, was applied to a carrier film and then dried to prepare a ceramic green sheet, thereby forming a dielectric layer 1.

Next, a conductive paste for internal electrodes including a nickel powder having an average particle size of 0.5 μm or less was prepared.

The conductive paste for internal electrodes was prepared by further adding a barium titanate ($BaTiO_3$) powder, besides the nickel powder.

The conductive paste for internal electrodes was applied to the ceramic green sheets by a screen printing method to form internal electrodes, and 100 to 300 internal electrodes were then stacked to form a stack.

Then, the stack was compressed and cut to form a chip having a 0603 standard size, and the chip was fired at a temperature of 1050° C. to 1200° C. under a reducing atmosphere containing $H_2$ of 0.2% or less.

Next, an external electrode forming process, a plating process, and the like were performed to thereby manufacture the multilayer ceramic capacitor.

In the following Table 1, when it is assumed that an average roughness of the center lines of first and second internal electrodes is Ra, short defect rates were compared according to a maximum distance from a virtual line corresponding to Ra to a bottom of a pit (d) formed below the virtual line.

Electrical short rates were measured with respect to the manufactured chips, evaluated based on the following reference, and shown in Table 1.
⊚: Excellent (Short Defect Rate: 0.1% or less)
○: Satisfactory (Short Defect Rate: 0.1% to 1.0%)
x: Defective (Short Defect Rate: 1.1% or more)

TABLE 1

| Sample NO. | Maximum Distance (μm) from Virtual Line corresponding to Ra to Bottom of Pit (d) | Determination |
|---|---|---|
| *1 | 19 | X |
| *2 | 18 | X |
| *3 | 17 | X |
| *4 | 16 | X |
| *5 | 15 | X |
| *6 | 14 | X |
| 7 | 13 | ○ |
| 8 | 12 | ○ |
| 9 | 11 | ○ |
| 10 | 10 | ○ |
| 11 | 9 | ○ |
| 12 | 8 | ○ |
| 13 | 7 | ○ |
| 14 | 6 | ○ |
| 15 | 5 | ⊚ |
| 16 | 4 | ⊚ |
| 17 | 3 | ⊚ |
| 18 | 2 | ⊚ |
| 19 | 1 | ⊚ |
| 20 | 0.9 | ⊚ |
| 21 | 0.8 | ⊚ |
| 22 | 0.7 | ⊚ |
| 23 | 0.6 | ⊚ |
| 24 | 0.5 | ⊚ |
| 25 | 0.4 | ⊚ |
| 26 | 0.3 | ⊚ |
| 27 | 0.2 | ⊚ |
| 28 | 0.1 | ⊚ |

It may be appreciated from the above Table 1 that in a case in which the maximum distance from the virtual line corresponding to Ra to the bottom of the pit (d) formed below the virtual line exceeds 13 μm, the electrical short rate increases, and thus a problem may be generated in a reliability test.

Meanwhile, it may be appreciated that in a case in which the maximum distance from the virtual line corresponding to Ra to the bottom of the pit (d) formed below the virtual line is in the range of 0.1 μm to 13 μm, the electrical short rate is low, and thus reliability is excellent.

As set forth above, according to the embodiments of the present invention, the occurrence of electrical shorts due to variations in the surface roughness of the internal electrode printed surface in accordance with the thinness of the internal electrode is decreased, whereby a large-capacitance multilayer ceramic electronic component having excellent reliability may be realized.

While the present invention has been shown and described in connection with the embodiments, it will be apparent to those skilled in the art that modifications and variations can be made without departing from the spirit and scope of the invention as defined by the appended claims.

What is claimed is:
1. A multilayer ceramic electronic component comprising:
a ceramic main body including a dielectric layer; and
first and second internal electrodes disposed to face each other within the ceramic main body and having the dielectric layer interposed therebetween,
wherein, when an average roughness of center lines of the first and second internal electrodes is Ra, a maximum distance from a virtual line corresponding to Ra to a bottom of a pit (d) formed below the virtual line is 0.1 μm to 5 μm.

2. The multilayer ceramic electronic component of claim 1, wherein the dielectric layer has an average thickness (td) of 2.0 μm or less.

3. The multilayer ceramic electronic component of claim 1, wherein the first and second internal electrodes have an average thickness (te) of 2.0 μm or less.

4. The multilayer ceramic electronic component of claim 1, wherein the first and second internal electrodes are stacked in an amount of 50 layers or more.

5. The multilayer ceramic electronic component of claim 1, wherein the multilayer ceramic electronic component has a length of 1.0±0.09 mm or less and a width of 0.5±0.09 mm or less.

6. The multilayer ceramic electronic component of claim 1, wherein the first and second internal electrodes include at least one metal selected from the group consisting of palladium (Pd), a palladium-silver (Pd—Ag) alloy, nickel (Ni), and copper (Cu).

* * * * *